(12) United States Patent
Kitano

(10) Patent No.: US 6,703,793 B2
(45) Date of Patent: Mar. 9, 2004

(54) SWITCHING POWER UNIT

(75) Inventor: Saburou Kitano, Sakai (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/212,107

(22) Filed: Aug. 6, 2002

(65) Prior Publication Data

US 2003/0031035 A1 Feb. 13, 2003

(30) Foreign Application Priority Data

Aug. 6, 2001 (JP) ........................................ 2001-238199

(51) Int. Cl.[7] ............................. H05B 41/16; H02M 7/04
(52) U.S. Cl. ............................ 315/224; 315/219; 363/89
(58) Field of Search ............................... 315/224, 276, 315/278, 282, 291, 219, 209 R, 208, 279; 363/89, 97, 37, 34; 219/130.31, 130.1, 130.33

(56) References Cited

U.S. PATENT DOCUMENTS

| | | | | |
|---|---|---|---|---|
| 5,089,751 A | * | 2/1992 | Wong et al. ................. | 315/279 |
| 5,192,896 A | * | 3/1993 | Qin ............................. | 315/224 |
| 5,404,082 A | * | 4/1995 | Hernandez et al. ......... | 315/219 |
| 5,434,478 A | * | 7/1995 | Kovalsky et al. ....... | 315/209 R |
| 5,933,340 A | * | 8/1999 | Adamson ..................... | 363/97 |
| 6,504,132 B1 | * | 1/2003 | Church ..................... | 219/130.1 |

FOREIGN PATENT DOCUMENTS

| JP | 08-149822 A | 5/1996 |
|---|---|---|
| JP | 2000-350445 A | 12/2000 |

* cited by examiner

Primary Examiner—Rajnikant B. Patel
(74) Attorney, Agent, or Firm—Birch, Stewart, Kolasch & Birch, LLP

(57) ABSTRACT

The switching power unit is a switching power unit of PWM system in which, in response to a secondary-side output voltage detected by an output voltage detecting circuit, a control circuit controls a duty of a main switching element so as to stabilize the output voltage. There is provided a filter circuit, preventing EMI, which is constituted of filter capacitors and a filter coil. In relation to the filter circuit, there is provided a discharging resistor which is constituted of two series resistors so as to prevent an accident by discharging electric charges of the filter capacitors quickly. A voltage of a connection point between the series resistors is applied to a power supplying capacitor of the control circuit via an activating resistor. Thus, when a power source is turned on, an activating current is supplied from a voltage whose value is ½ with respect to a root means square value of a rough input ac voltage, so that it is possible to reduce a loss in an activating circuit which activates the control circuit.

18 Claims, 14 Drawing Sheets

SWITCHING POWER UNIT 11

SWITCHING POWER UNIT

FIELD OF THE INVENTION

The present invention relates to a switching power unit which is preferably realized as a so-called AC/DC converter, and particularly to reducing a loss in an activating circuit thereof.

BACKGROUND OF THE INVENTION

There is wide use of a switching power unit, used in a portable-compact electronic device, which switches a dc current obtained by rectifying and smoothing a commercial current at a high frequency such as several hundreds kHz, so as to convert the dc current into a desired voltage by means of a compact transformer with high efficiency.

FIG. 14 is an electronic circuit diagram of a typical switching power unit 1 of prior art. A pulse width modulation (PWM) system and of a flyback system are employed in the switching power unit 1. In the switching power unit 1, an ac voltage applied to a line between terminals p1 and p2 flows via (a) a filter circuit, constituted of a fuse 2, filter capacitors c1 and c2, a filter coil 1, which prevents EMI, and (b) a discharging resistor r1. Thereafter, the ac voltage is rectified and smoothed by a diode bridge 3 and a smoothing capacitor c3. A dc voltage obtained in this manner is applied to a dc circuit constituted of a primary winding n1 of a transformer n and a main switching element q which is an FET, and a main switching element q is switched at a high frequency by a control circuit 4 as described later, so that an induced voltage occurs in a secondary winding n2 of the transformer n when the main switching element q is OFF. The induced voltage is rectified and smoothed by a diode d1 and a smoothing capacitor c4 so as to be outputted from terminals p3 and p4 to a load which is not shown.

When a user pulls an AC plug out from a socket for example, there is a possibility that the user gets an electric shock while filter capacitors c1 and c2 are kept to be charged. Thus, there is provided the discharging resistor r1 so as to discharge the filter capacitors c1 and c2 quickly, thus preventing an accident.

An output voltage detecting circuit 5 monitors an output voltage from terminals p3 and p4, and sends the detected output voltage from a photodiode d2 of a photo-coupler pc to a phototransistor tr, so as to feedback the output voltage to the control circuit 4 on the primary side. The control circuit 4 controls a duty of the main switching element q in accordance with data of the output voltage that has been fedback, so that an output voltage of the switching power unit is stabilized.

While, there is provided a capacitor c5 as a power source of the control circuit 4. The dc current that has been rectified and smoothed by the diode bridge 3 and the smoothing capacitor c3 is applied to the capacitor c5 via the activating resistors r2 and r3. Thus, when a dc power source is connected to the terminals p1 and p2 so as to activate the switching power unit 1, a charging voltage of the capacitor c5 gradually increases. When the charging voltage becomes a voltage at which the control circuit 4 begins to operate, the control circuit 4 begins to operate so as to send a control signal to the main switching element q, so that the aforementioned switching operation is started.

Further, a voltage induced in a sub winding n3 of the transformer n is applied to the capacitor c5 via the diode d3. Also in this manner, the capacitor c5 is charged. Thus, after the activation, the control circuit 4 keeps on operating by using the current supplied via the diode d3 as a power source. Furthermore, there is provided a protecting zener diode zd on the capacitor c5 in parallel to each other so that the charging voltage of the capacitor c5 applied by the activating resistors r2 and r3 does not exceed a rated voltage in a low-power-consumption mode of the control circuit 4.

The low-power-consumption mode is a mode in which an operation of the control circuit 4 is stopped so that a low charging voltage of the capacitor c5 does not cause the control circuit 4 to malfunction when power is turned on. In the low-power-consumption mode, a low voltage malfunction preventing circuit that is internally provided in the control circuit 4 stops an operation of the control circuit 4 in a period since power is turned on until the charging voltage of the capacitor c5 becomes a predetermined voltage at which the control circuit 4 begins to operate. During the period in which the operation is stopped, the control circuit hardly consumes a current. Further, even though a power voltage becomes lower than an operation low limit voltage due to any causes during the steady-state operation of the switching power unit, the low voltage malfunction preventing circuit works, so that the switching power unit becomes in the low-power-consumption mode. Then, the voltage at which the operation is started is set to be higher than the operation low limit voltage, so that a stable operation is ensured.

A current detecting resistor r4 is connected to the main switching element q in series. A current flowing in the main switching element q is converted into a voltage by the current detecting resistor r4. The converted voltage is inputted as a voltage Va, via a noise-removing low pass filter constituted of the resister r5 and a capacitor c6, to a current detecting terminal a of the control circuit 4 which is used to detect an overcurrent. When a peak of the voltage Va exceeds a predetermined overcurrent detecting level, the control circuit 4 performs an overcurrent protecting operation for stopping the switching operation of the main switching element q. This prevents a damage in the main switching element q which is brought about by a reason for which an output current higher than a rated current is drawn from the terminals p3 and p4. At this time, an operation mode of the control circuit 4 shifts to the low-power-consumption mode, so that a power consumption in the control circuit is greatly reduced.

The low pass filter is inserted so as to prevent malfunction of the control circuit 4 which is brought about by a reason for which a sharp current flowing upon turning on the main switching element q causes the voltage Va to exceed a predetermined overcurrent detecting level.

Further, the capacitor c6 is charged with a dc voltage from the smoothing capacitor c3 via bias resistors r6 and r7, and the capacitor c6 is discharged by the resistor r5 and the current detecting resistor r4 when the main switching element q is turned off. Thus, the bias resistors r6 and r7 charge the capacitor c6 so as to have a voltage Va calculated by the following expression, so that the current detecting terminal a of the control circuit 4 is biased by the voltage Va.

$$Va = \sqrt{2} Vac \times (r5+r4)/(r6+r7+r5+r4)$$

Then, a voltage increment of the current detecting circuit r4 which is brought about by a current of the main switching element q is added to the right side of the foregoing expression, and the voltage is applied, as an increment of the voltage Va, to the current detecting terminal a of the control circuit 4 as described above.

Thus, when the main switching element q remains ON for a time more than a predetermined time due to output short circuit etc. so as to keep on charging the capacitor c6, the voltage Va exceeds the overcurrent detecting level due to the charging performed by the bias resistors r6 and r7, so that a short circuit protecting operation, by which the main switching element q is OFF-driven, is performed.

Further, in a case where there are not provided the bias resistors r6 and r7, there occurs the following problem: if the overcurrent detecting level is set with respect to an input ac voltage of 100 V for example, the overcurrent protecting operation is not performed unless the overcurrent detecting level is more than the set overcurrent detecting level when the input ac voltage is changed to 200 V. Thus, the bias resistors r6 and r7 are provided and the bias voltage value is changed according to the input ac voltage, so that it is also possible to make the overcurrent detecting level substantially fixed.

A series circuit constituted of the diode d4 and the capacitor c7 is connected to the primary winding n1 of the transformer n in parallel to each other so as to absorb a counter-electromotive force which occurs in the primary winding n1 when the main switching element q is OFF. Further, the resistor r8 is connected to the capacitor c7 in parallel to each other so as to consume a charge that has been accumulate in the capacitor c7 temporarily.

In the switching power unit 1 arranged as described above, when the overcurrent protecting operation is realized in accordance with the current detecting resistor r4, there occurs the following problem: in a case where 200 V is inputted compared with a case where 100 V is inputted, a difference between ac voltages inputted to the terminals p1 and p2 causes a current flowing in the main switching element q to be reduced by substantially half. Therefore, at the overcurrent detecting level in the case of 100 V, the protecting function does not work in the case of 200 V. Thus, in order to compensate the influence exerted by the difference in the input ac voltage, the current detecting terminal a is biased by the bias resistors r6 and r7 as described above so as to change the bias amount according to the input ac voltage value.

However, not only the bias resistors r6 and r7 but also the activating resistors r2 and r3 are connected to an output terminal of a dc voltage from the diode bridge 3 and the smoothing capacitor c3 both of which have high voltages, so that there occurs the following problem: power conversion efficiency of the switching power unit is deteriorated due to a large power consumption brought about by the resistors r2, r3; r6, r7. Further, although some of other prior arts are arranged so that the activating resistors r2 and r3 are connected to an AC line, that is, a line connected to the terminals p1 and p2, they have substantially the same arrangement as the foregoing prior art in that the activating resistors r2 and r3 are connected to a high voltage portion.

SUMMARY OF THE INVENTION

The object of the present invention is to provide a switching power unit which can reduce a loss in an activating circuit.

In order to achieve the foregoing object, the switching power unit of the present invention includes: a main switching element for performing switching with respect to a dc voltage that has been obtained by rectifying an input ac voltage with a rectifying circuit; a control circuit for controlling the switching according to output voltage data fedback from a secondary side so as to stabilize an output voltage at a desired value; a plurality of series resistors provided on an input side of the rectifying circuit; and an activating resistor for supplying an activating current from a connection point between the series resistors to the control circuit.

In a case where a dc voltage rectified by the rectifying circuit is smoothed and used as a power source of the control circuit, supposing that a peak value of an input ac voltage, that is, a root means square value of the input ac voltage is Vac, a voltage applied to the control circuit is a dc voltage of $\sqrt{2}$ Vac. On the other hand, in case of using a voltage which is smoothed after being drawn from the connection point between the series resistors provided on the input side, the voltage applied to the control circuit takes a dividing value that has been obtained by dividing a root means square value of a rough input ac voltage by means of the series resistors. Here, supposing that dividing number is N, the voltage applied to the control circuit is $|(\sqrt{2}\ Vac \times \sin\omega t)/N|$, and when N=2 for example, $|Vac \times \sin\omega t)/\sqrt{2}|$.

Thus, the loss brought about by the activating resistor is reduced, so that it is possible to improve a power conversion efficiency of the switching power unit.

For a fuller understanding of the nature and advantages of the invention, reference should be made to the ensuing detailed description taken in conjunction with the accompanying drawings.

DESCRIPTION OF THE EMBODIMENTS

A first embodiment of the present invention is described as follows based on FIG. 1 to FIG. 3.

Figure 1:
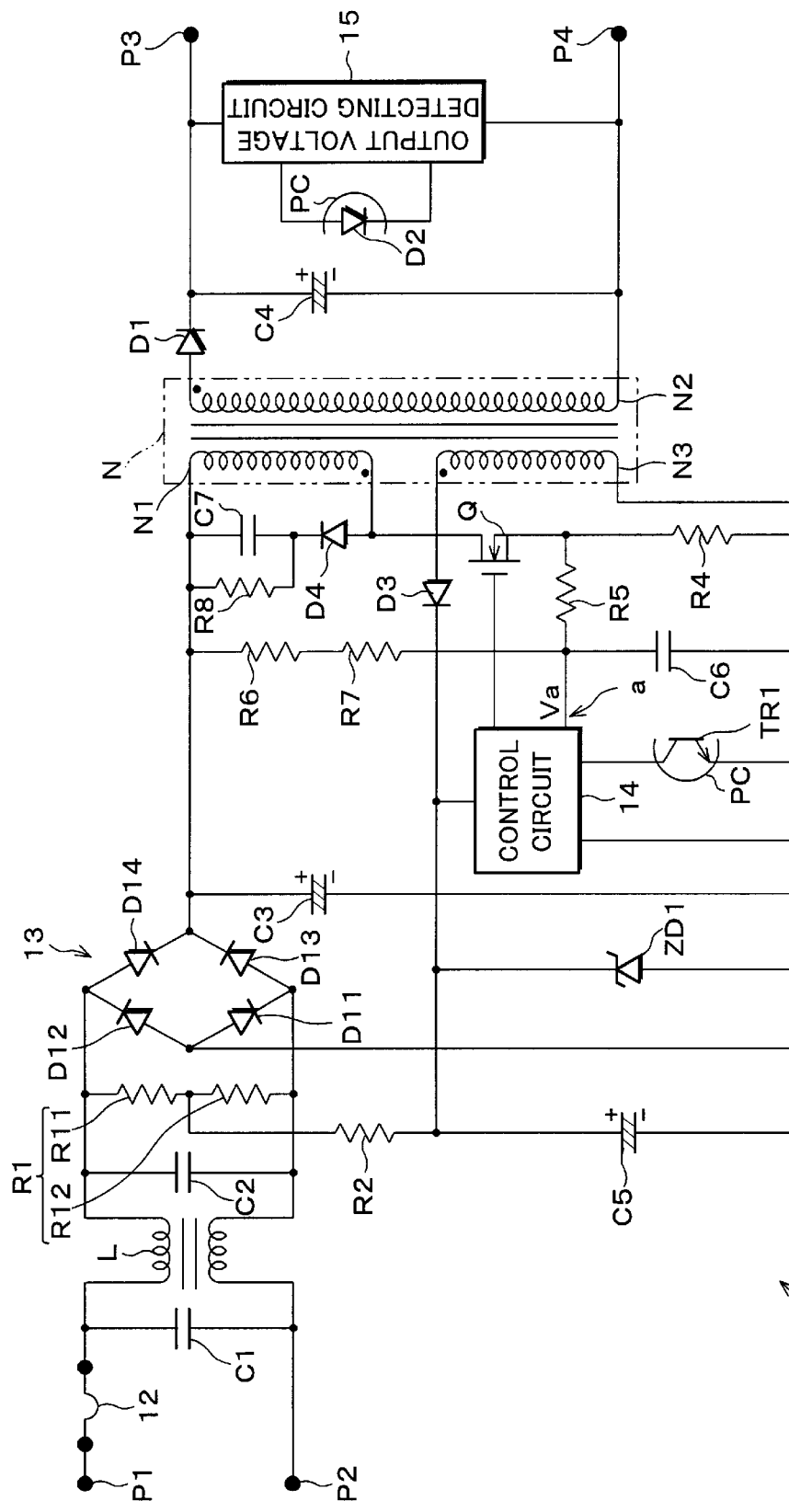
FIG. 1 is an electric circuit diagram of a switching power unit of a first embodiment of the present invention.
Figure 2:
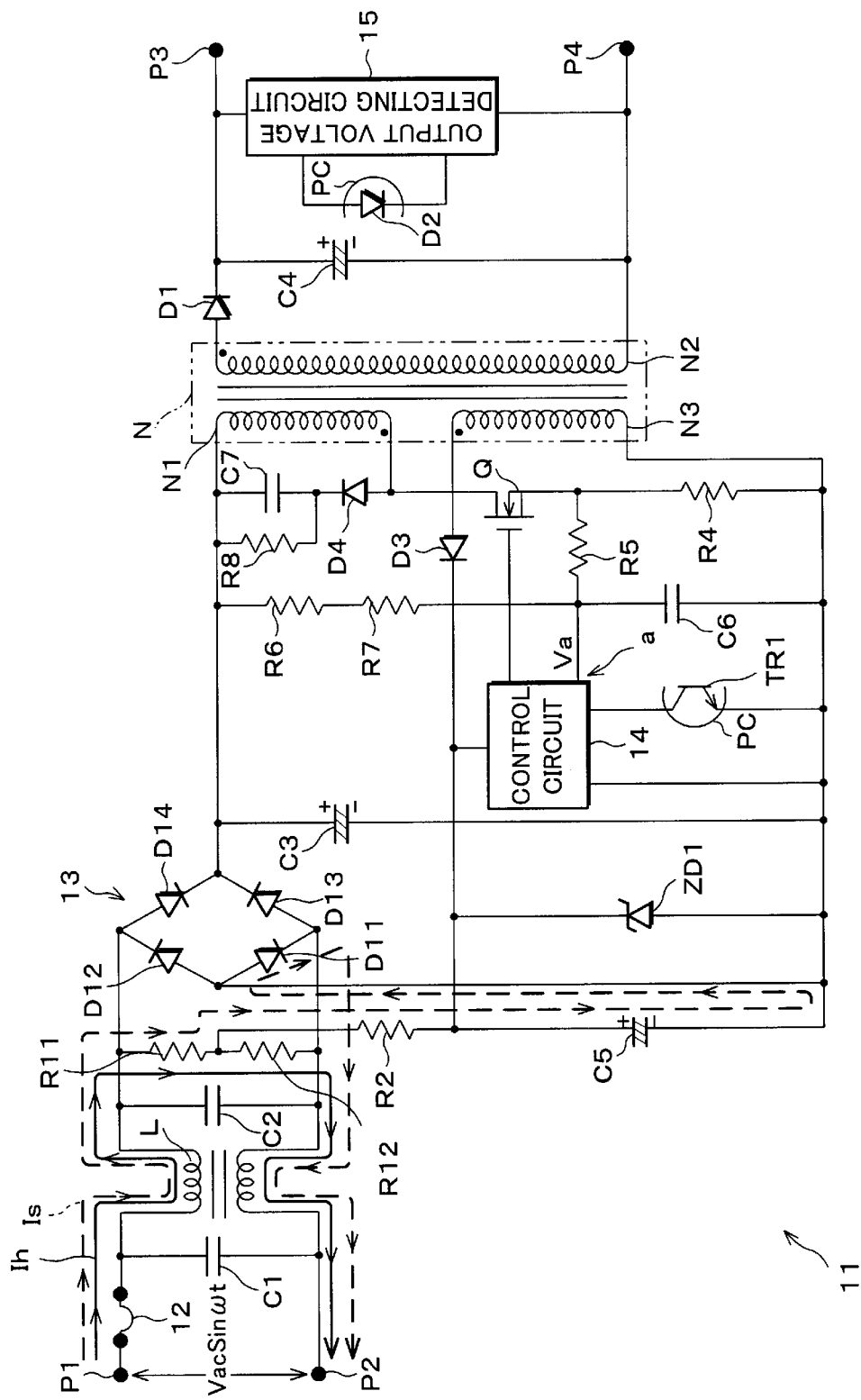
FIG. 2 is a current path diagram for illustrating an operation of the switching power unit shown in FIG. 1.

FIG. 1 is an electric circuit diagram of a switching power unit 11 of the first embodiment of the present invention.

The switching power unit 11 is a switching power unit of a PWM system and a flyback system. In the switching power unit 11, an ac voltage applied between terminals P1 and P2 is rectified and smoothed by (a) a diode bridge 13 made up of diodes D11 to D14 and (b) a smoothing capacitor C3 after passing through a fuse 12, a filter circuit for preventing EMI, and a discharging resistor R1. The filter circuit is constituted of a filter capacitors C1 and C2 and a filter coil L.

A dc voltage obtained in this manner is applied to a dc circuit constituted of (a) a primary winding N1 of a transformer N and (b) a main switching element Q which is an FET. Then, the main switching element Q is switched by a control circuit 14 at a high frequency as described later, so that an induced voltage occurs in a secondary winding N2 of the transformer N when the main switching element is OFF. The induced voltage is rectified and smoothed by the diode D1 and the smoothing capacitor C4 so as to be outputted from terminals P3 and P4 to a load (not shown).

When a user pulls an AC plug out from a socket for example, there is a possibility that the user gets an electric shock while filter capacitors C1 and C2 are kept to be charged. Thus, there is provided a discharging resistor R1 so as to discharge the filter capacitors C1 and C2 quickly, thus preventing an accident.

An output voltage detecting circuit 15 monitors an output voltage from the terminals P3 and P4. The detected output voltage is send from a photodiode D2 of a photo-coupler PC to a phototransistor TR1, so as to carry out feedback in the control circuit 14 on the primary side. The control circuit 14 controls a duty of the main switching element Q in accordance with data of the output voltage that has been fedback, so that an output voltage of the switching power unit 11 is stabilized.

While, there is provided a capacitor C5 as a power source of the control circuit 14. In the present embodiment, it is noteworthy that a discharging resistor R1 is divided into two series resistors R11 and R12 intervening between input terminals of the diode bridge 13, that is, between a commercial power source and a power line, and a voltage of a connection point between the series resistors R11 and R12 is applied to the capacitor C5 via an activating resistor R2. Thus, when an ac power source is connected to the terminals P1 and P2 so as to activate the switching power unit 11, a charging voltage of the capacitor C5 gradually increases. When the charging voltage becomes a voltage at which the control circuit 14 begins to operate, the control circuit 14 begins to operate so as to send a control signal to the main switching element Q, so that the aforementioned switching operation is started.

Further, a voltage induced in a sub winding N3 of the transformer N is applied to the capacitor C5 via the diode D3, so that the capacitor C5 is charged. Thus, after the activation, the control circuit 14 keeps on operating by using the current supplied via the diode D3 as a main power source. Furthermore, there is provided a protecting zener diode zd in parallel to the capacitor C5 so that a voltage, at which the capacitor C5 is charged by the activating resistor R2, does not exceed a rated voltage in a low-power-consumption mode of the control circuit 14.

A current detecting resistor R4 is connected to the main switching element Q in series, and a current flowing in the main switching element Q is converted into a voltage by the current detecting resistor R4. The converted voltage is inputted, via a noise-removing low pass filter constituted of the resister R5 and a capacitor C6, to a current detecting terminal a of the control circuit 14 as a voltage Va. When a peak of the voltage Va exceeds a predetermined overcurrent detecting level, the control circuit 14 performs an overcurrent protecting operation for stopping the switching operation of the main switching element Q, so that an output current more than the rated current is not drawn from the terminals P3 and P4. This prevents a damage in the main switching element Q. At this time, an operation mode of the control circuit 14 shifts to the low-power-consumption mode, so that a power consumption in the control circuit 14 is greatly reduced.

Further, the capacitor C6 is charged with a dc voltage from the smoothing capacitor C3 via bias resistors R6 and R7, and the capacitor C6 is discharged by the resistor R5 and the current detecting resistor R4 when the main switching element q is OFF. An arrangement for biasing the current detecting terminal a of the control circuit 14 by means of the bias resistors R6 and R7 is made in the same manner as in the foregoing switching power unit 1. Thus, when the main switching element Q remains ON for a time more than a predetermined time so as to keep on charging the capacitor C6, the voltage Va exceeds the overcurrent detecting level, so that a short circuit protecting operation, in which the main switching element Q is OFF-driven, is performed.

When the main switching element Q is OFF, it is necessary to absorb a counter-electromotive force which occurs in the primary winding N1. Thus, a series circuit constituted of the diode D4 and the capacitor C7 is connected to the primary winding N1 of the transformer N in parallel, and, the resistor R8, which consumes a charge accumulated in the capacitor C7 temporarily, is connected to the capacitor C7 in parallel.

In the switching power unit 11 arranged as described above, there is provided the discharging resistor R1 on the input-terminal side of the diode bridge 13 so as to be divided into two series resistors R11 and R12, and a voltage of a connection point between the series resistors R11 and R12 is applied to the capacitor C5 via the activating resistor R2. Thus, in a case where polarity of the input ac voltage is positive on the side of the terminal P1 and negative on the side of the terminal P2 upon activation of the switching power unit 11 in which the ac voltage is applied to the terminals P1 and P2, as shown by the reference sign Is in FIG. 2, a current flows in the following order: terminal P1—fuse 12 —one winding of filter coil L—series resistor R11—activating resistor R2—capacitor C5—diode D11 in diode bridge 13—the other winding of filter coil L—terminal P2. The capacitor C5 is charged with this current.

Figure 3A:
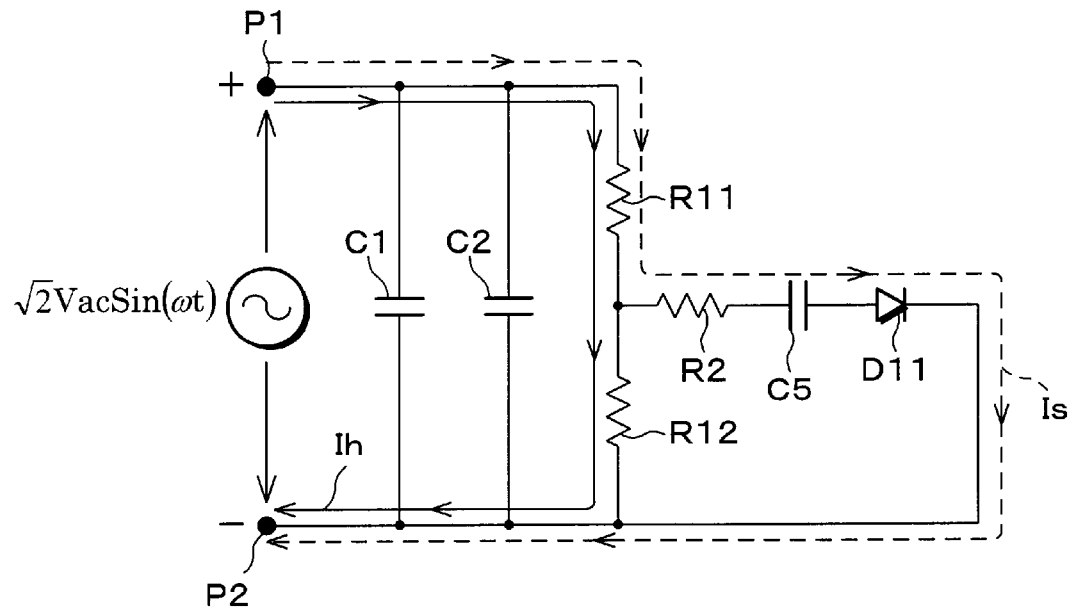
FIG. 3(a) and FIG. 3(b) are equivalent circuit diagrams of FIG. 2.

Further, as shown by the reference sign Ih in FIG. 2, the current also flows in the following order: terminal P1—fuse 12—one winding of filter coil L—series resistor R11—series resistor R12—the other winding of filter coil L—terminal P2. FIG. 3(a) shows an equivalent circuit in this case. Note that, in FIG. 2, FIG. 3(a), and FIG. 3(b), the current which flows from the diode bridge 13 to the smoothing capacitor C3 is omitted.

Figure 3B:
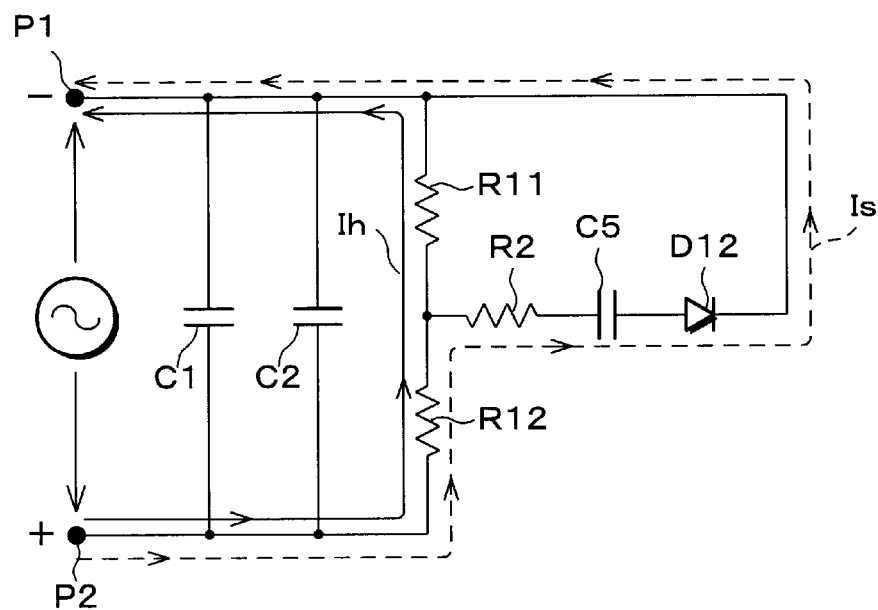

While, in a case where the potential is negative on the side of the terminal P1 and positive on the side of the terminal P2, as shown by the reference sign Is in FIG. 3(b), the current flows in the following order: terminal P2—the other winding of filter coil L—series resistor R12—activating resistor R2—capacitor C5—diode D12 of diode bridge 13—one winding of filter coil L—fuse 12—terminal P1. The capacitor C5 is charged with this current. Further, as shown by the reference sign Is in FIG. 3(b), the current also flows in the following order: terminal P2—the other winding of filter coil L —series resistor R12—series resistor R11—the other winding of filer coil L—fuse 12—terminal P1.

At a charging period of the capacitor C5, the control circuit 14 is operated in the low-power-consumption mode, so that the control circuit 14 hardly consumes power. Thus, when a charging voltage of the capacitor C5 increases so as to be a voltage at which the control circuit 14 begins to operate, the control circuit 14 begins to operate so as to send a control signal to the main switching element Q. Thus, the main switching element Q performs the switching operation so as to supply power to a load. At the same time, the induced voltage occurs in the sub winding N3 of the transformer N and the induced voltage is rectified and smoothed by the diode D3 and the capacitor C5, so that the control circuit 14 is operated by using the charging voltage of the capacitor C5 as a main power source as described above.

However, also after this operation has been started, a charging current is supplied to the capacitor C5 in the path having the activating resistor R2 between the series resistor R11 or R12 and the capacitor C5, so that there occurs a joule loss in the resistors R1, R12; R2. However, compared with the conventional switching power unit 1 shown in FIG. 14, the loss is less.

That is, in the switching power unit 1, when the activating current supplied via the activating resistors r2 and r3 causes the capacitor c5 to have a voltage at which the control circuit 4 begins to operate, the control circuit 4 begins to operate. Thus, although it is possible to reduce the loss by making resistance values of the activating resistors r2 and r3 larger, it takes longer time to activate the power source. If the time taken to turn on the power source is longer, uncomfortable feeling occurs in operation.

While, in the switching power unit 1, there occurs a little delay in a time taken to supply a current induced in the sub winding N3 of the transformer N to the capacitor c5 after the control circuit 4 has began to operate, so that it is necessary to keep the operation of the control circuit 4 with a current discharged from the capacitor c5 during the delay time. Here, although it is possible to shorten the time taken to turn on the power source by making the capacitance of the capacitor c5 smaller, when the control circuit 4 begins to operate, a current consumed in the control circuit 4 exceeds the activating current supplied via the activating resistors r2 and r3, so that it becomes impossible to keep the operation of the control circuit 4.

Thus, it is necessary to compensate the charging voltage of the capacitor c5 so as not to be lower than the low limit voltage, at which the control circuit 4 can operate, before a current is supplied from the sub winding N3 of the transformer N. Therefore, it is impossible to make the resistance values of the activating resistors r2 and r3 much larger.

Figure 14:
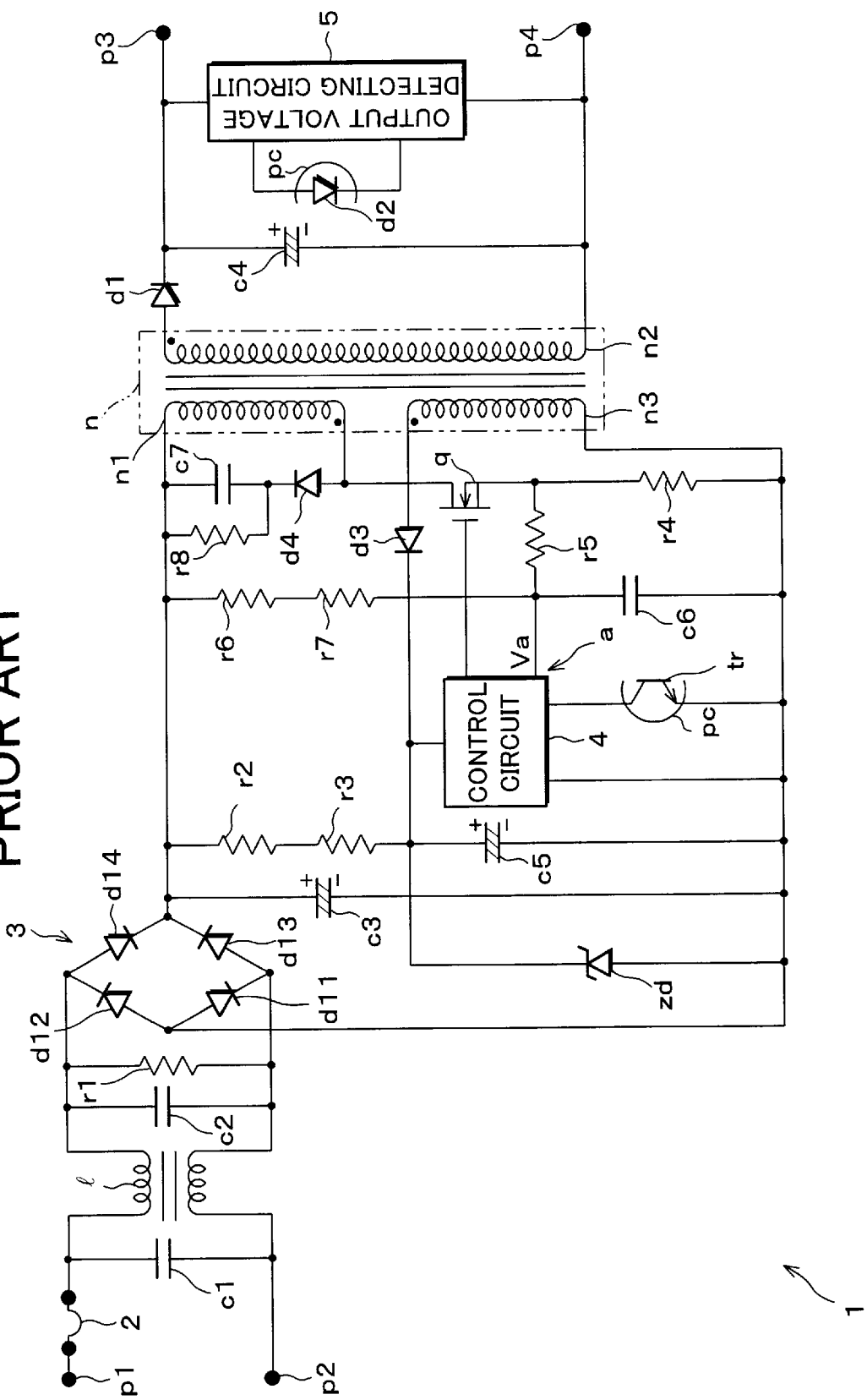
FIG. 14 is an electric circuit diagram of a typical switching power unit in prior art.

Then, supposing that the same current is supplied to the capacitors c5 and C5 upon activation, in the switching power unit 1 of FIG. 14, when a root means square value of the input ac voltage is Vac, an activating current is supplied from √2Vac, that is, a dc voltage of a peak value. On the other hand, in the switching power unit 11, when resistance values of the series resistors R11 and R12 are equal to each other, and Ih>>Is, and voltage drop which occurs in a forward direction of the diodes D11 and D12 is ignored, as shown in the following expression, the activating current is substantially supplied from a voltage whose value is ½ with respect to the root means square value of the input ac voltage.

$$|(\sqrt{2}Vac \times \sin\omega t)/2| = |(Vac \times \sin\omega t)/\sqrt{2}|$$

Thus, it is possible to reduce the loss brought about by the resisters R11, R12; R2 which are current restricting resistors with respect to the capacitor C5, compared with the loss brought about by the activating resistors r2 and r3 of FIG. 14 which are current restricting resistors with respect to the capacitor c5. In this manner, it is possible to reduce the loss of the activating circuit.

For example, in the switching power unit of a pulse width modulation system and a flyback system, supposing the following case, both the switching power units 1 and 11 are compared in terms of power consumption. Vac=100 V, capacitor c5: capacitor C5 both of which have a capacitance value of 22 μF, filter capacitors c1 and c2: filter capacitor C1 and C2 both of which have a synthetic capacitance value of 0.57 μF, resistors r2 and r3 having a series resistance value of 200 kΩ, discharging resistor r1 having a resistance value of 560 kΩ, series resistors R11 and R12 having a resistance value of 270 kΩ, activating resistor R2 having a resistance value of 270 kΩ. In this case, an unloaded input power is 85 mW in the conventional switching power unit 1 of FIG. 14. On the other hand, it is possible to reduce the unloaded power to 75 mW in the switching power unit 11 of the present invention shown in FIG. 1.

Further, it is not necessary to newly provide resistors as series resistors R11 and R12, so that it is possible to reduce the number of parts.

Note that, resistance values of resistors newly provided as the series resistors R11 and R12 constituting the discharging resistor R1 are set so that: a discharging time constant is divided by capacitance of the capacitors C1 and C2, so that an entire resistance value of the discharging resistor R1 is determined. Thereafter, the set value is bisected. As described later, it is also possible to omit the activating resistor R2 in a case where a resistance value of the discharging resistor R1, at which it is possible to obtain a desired discharging time constant, is large.

A discharging time constant of the capacitors C1 and C2, in a case where the terminals P1 and P2 are separated from the power source, is expressed as follows.

$$(C1+C2) \times (R11+R12)$$

A second embodiment of the present invention is described as follows based on FIG. 4 and FIG. 5.

Figure 4:
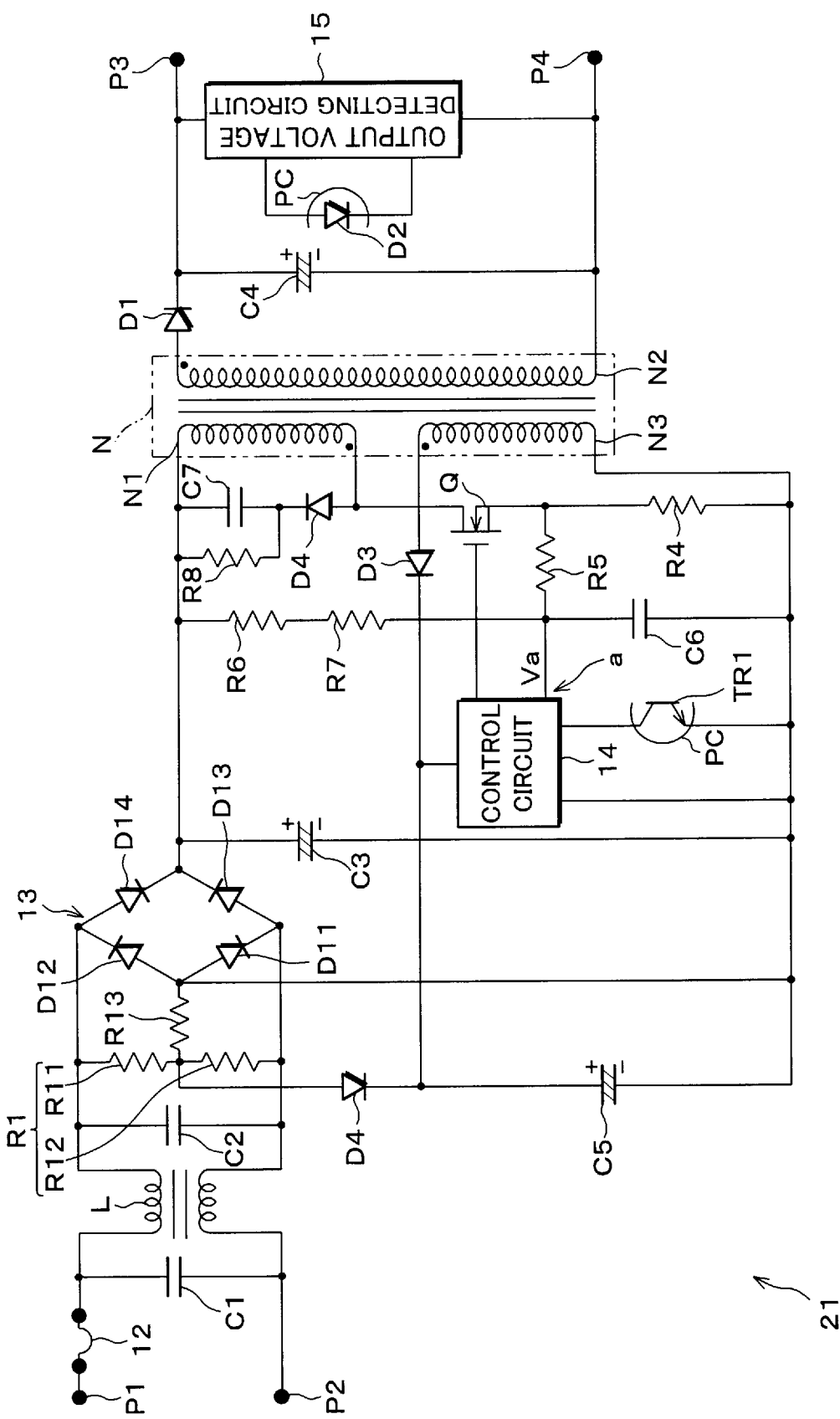
FIG. 4 is an electric circuit diagram of a switching power unit of a second embodiment of the present invention.

FIG. 4 is an electric circuit diagram of a switching power unit 21 of the second embodiment of the present invention. The switching power unit 21 is similar to the aforementioned switching power unit 11, so that the same reference signs are given to corresponding portions and description thereof is omitted.

It is noteworthy that, in the switching power unit 21, a connection point between the series resistors R11 and R12 is connected to a dc-low-level-side terminal of the diode bridge 13 via the resistor R13, and a diode D4 is correspondingly used instead of the activating resistor R2. That is, if the connection point between the series resistors R11 and R12 is connected to the dc-low-level-side terminal of the diode bridge 13 via the resistor R13, there occurs the following problem: during a period at which a voltage level of the input ac voltage is low, an electric charge for charging the capacitor C5 is discharged via the resistor R13, so that an extra loss is brought about. Thus, the diode D4 is used instead of the activating resistor R2. In a case where the loss is so small that the loss can be accepted, the following arrangement may be made: the diode D4 is omitted and the connection point between the series resistors R11 and R12 is directly connected to the capacitor C5.

By making an arrangement in the foregoing manner, a path for charging the capacitor C5 is similar to the aforementioned arrangement when the power source is turned on, that is, when a charging voltage of the capacitor C5 is low. However, when the charging voltage of the capacitor C5 rises, the capacitor C5 is charged as follows: in a case where polarity of the input ac voltage is such that a potential is positive on the side of the terminal P1 and negative on the side of the terminal P2, as shown by the reference sign Is in FIG. 5(a), a current flows in the following order: terminal P1—fuse 12—one winding of filter coil L—series resistor R11—diode D4—capacitor C5—diode D11 in diode bridge 13—the other winding of filter coil L, terminal P2.

Figure 5A:
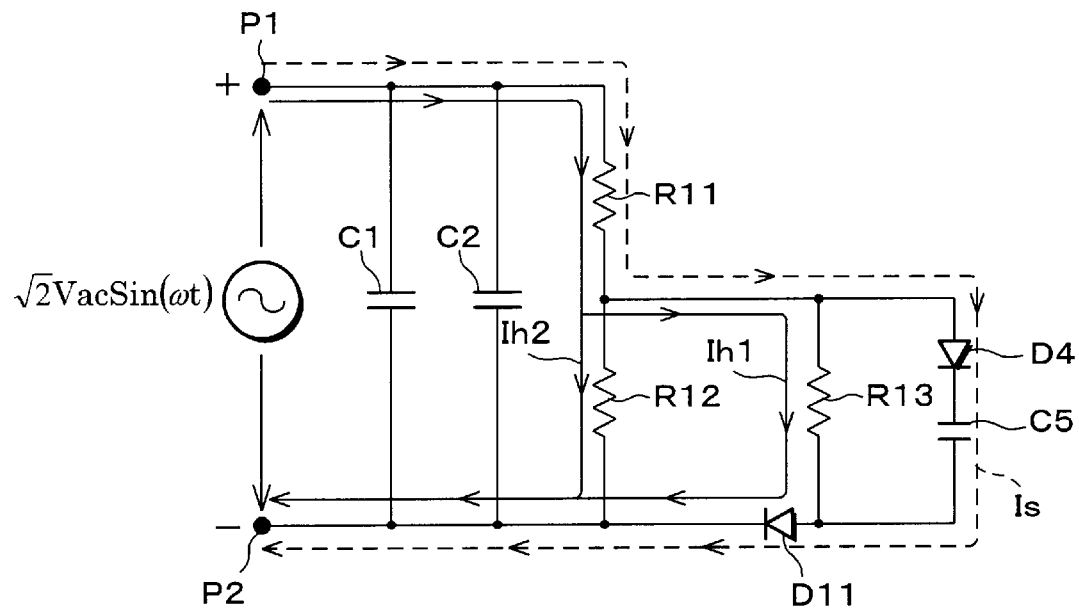
FIG. 5(a) and FIG. 5(b) are equivalent circuit diagrams of a current path which illustrate operations of the switching power unit shown in FIG. 4.

Further, as shown by the reference sign Ih1 in FIG. 5(a), a current flows in the following order: terminal P1—fuse 12—one winding of filter coil L—series resistor R11—resistor R13—diode D11 in diode bridge 13—the other winding of filter coil L—terminal P2. At the same time, as shown by the reference sign Ih2, a current flows in the following order: terminal P1—fuse 12—one winding of filter coil L—series resistor R11—series resistor R12—the other winding of filter coil L—terminal P2.

Figure 5B:
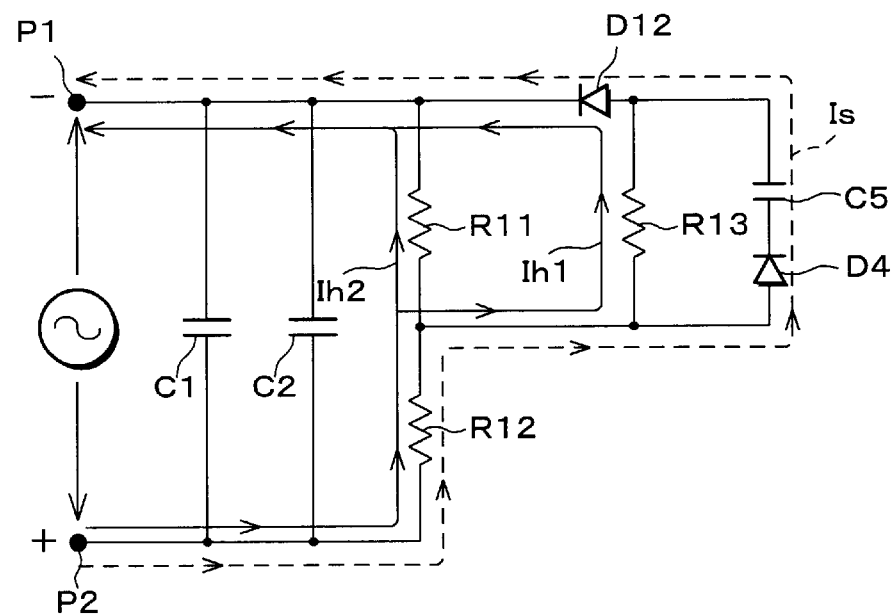

On the other hand, in a case where potential is negative on the side of the terminal P1 and positive on the side of the terminal P2, as shown by the reference sign Is in FIG. 5(b), a current flows in the following order: terminal P2—the other winding of filter coil L—series resistor R12—diode D4—capacitor C5—diode D12 in diode bridge 13—one winding of filter coil L—fuse 12—terminal P1. The current charges the capacitor C5. Further, as shown by the reference sign Ih1, a current flows in the following order: terminal P2—the other winding of filter coil L—series resistor R12—resistor R13—diode D12 in diode bridge 13—one winding of filter coil L—fuse 12—terminal P1. At the same time, as shown by the reference sign Ih2, a current flows in the following order: terminal P2—the other winding of filter coil L—series resistor R12—series resistor R11—the other winding of filter coil L—terminal P2.

Here, when a root means square value of the input ac voltage is Vac, and Ih>>Is as described above, and voltage drop which occurs in a forward direction of the diodes D11 and D12 is ignored, a voltage of the connection point between the series resistors R11 and R12 is expressed as follows.

$$\frac{\frac{R12 \times R13}{R12 + R13}}{R11 + \frac{R12 \times R13}{R12 + R13}} |\sqrt{2} \, Vac \times \sin\omega t|$$

Here, R11=R12 is set, so that the polarity of the input ac voltage does not cause the foregoing voltage to vary.

Thus, the resistance values of the series resistors R11 and R12 are equalized to each other and a resistance value of the resistor R13 is adjusted with respect to a resistance value of the resistor R12, so that the voltage of the connection point between the series resistors R11 and R12 further drops from the voltage of the same connection point in the arrangement of FIG. 1. Thus, it is possible to adjust the voltage of the connection point to be not more than the rated voltage of the control circuit 14. Therefore, it is possible not only to omit the activating resistor R2, which functions as a current restricting resistor, so as to reduce the loss brought about by the activating resistor R2, but also to omit the zener diode ZD1 for preventing the charging voltage of the capacitor C5 from rising excessively.

For example, as in the switching power unit 1 of FIG. 1, in a case where Vac=100 V, and a capacitance value of the capacitor C5 is 22 $\mu$F, and a synthesis capacitance value of the filter capacitors C1 and C2 is 0.57 $\mu$F, and a resistance value of the series resistors R11 and R12 is 330 k$\Omega$, and a resistance value of the activating resistor R2 is 100 k$\Omega$, it is possible to reduce the input voltage to 70 mW upon loading.

Further, as to the switching power unit 11, in a case where a resistance value of the discharging resistor R1 at which a desired discharging time constant can be obtained in accordance with capacitance of the capacitors C1 and C2 is large, it is possible to omit the activating resistor R2, which functions as a current restricting resistor, as described later. On the other hand, as to the switching power unit 21, it is possible to omit the activating resistor R2 also in a case where a resistance value of the discharging resistor R1 is small.

The discharging time constant of the capacitors C1 and C2, in a case where the terminals P1 and P2 are separated from the power source, is expressed as follows.

$$(C1 + C2) \times \left[ R11 + \frac{R12 \times R13}{R12 + R13} \right]$$

Here, R11=R12 is set, so that the charging polarity of the capacitors C1 and C2 upon turning off the power source does not cause the foregoing value to vary.

A third embodiment of the present invention is described as follows based on FIG. 6 to FIG. 9.

Figure 6:
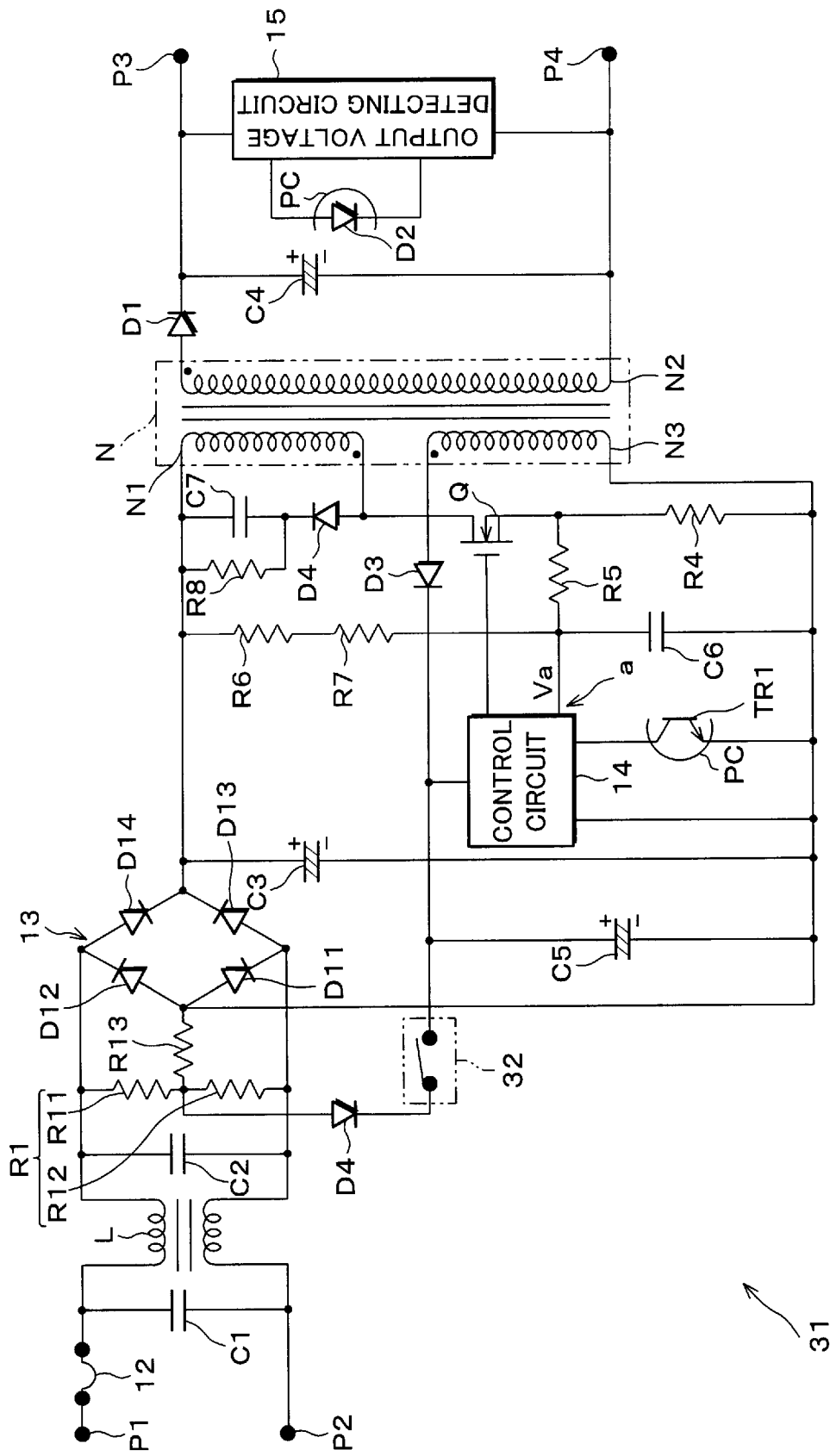
FIG. 6 is a diagram schematically of a switching power unit of a third embodiment of the present invention.

FIG. 6 is a diagram schematically showing an arrangement of a switching power unit of the third embodiment of the present invention. The switching power unit 31 is similar to the switching power unit 21, so that the same reference signs are given to corresponding portions, and description thereof is omitted.

It is noteworthy that, in the switching power unit 31, a switch circuit 32 is added in series to the diode D4 which connects the connection point between the series resistors R11 and R12 to the capacitor C5. When the switch circuit 32 becomes ON when the power source is turned on, and becomes OFF when the switch circuit 32 is in a steady-state operation in which an induced voltage is supplied from the sub winding N3 of the transformer N via the diode D3 to the capacitor C5 as described above, so that a loss brought about by the activating circuit is further reduced.

Prior art has an idea in which the switch circuit is inserted into the activating circuit, and the switch circuit is sometimes inserted into the activating resistors r2 and r3 of FIG. 14 in series. However, since the charging voltage of the smoothing capacitor c3 is high as described above, it is necessary to provide a high-voltage-withstand switch circuit. On the other hand, in the switching power unit 31, as described above, the resistor R13 causes the voltage of the connection point between the series resistors R11 and R12 to be low, so that a low-voltage-withstand switch circuit can be used. Thus, it is possible to reduce the manufacturing cost.

Figure 7:
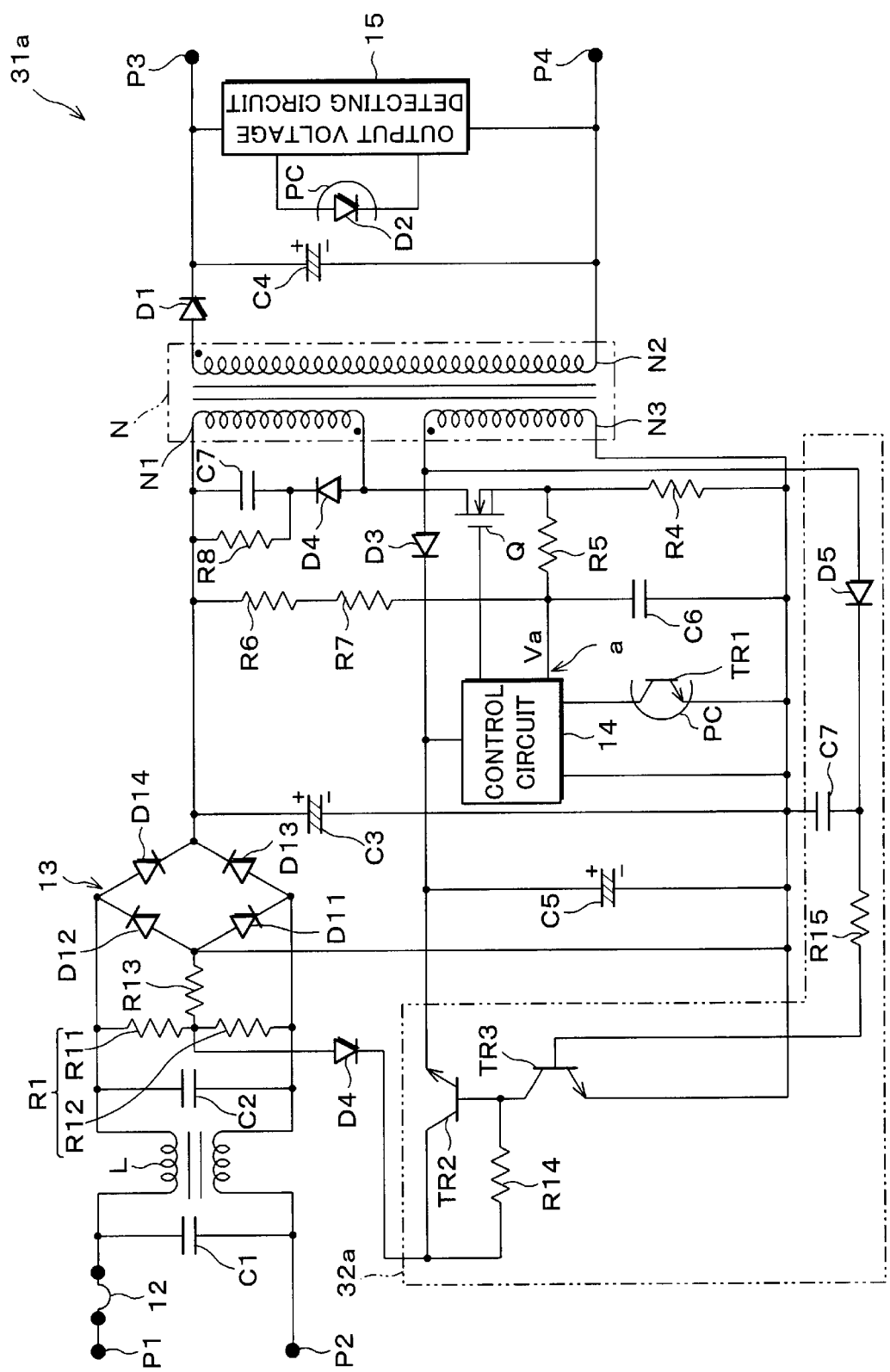
FIG. 7 is an electric circuit diagram for illustrating a concrete example of a switch circuit of the switching power unit shown in FIG. 6.

FIG. 7 is an electric circuit diagram of a switching power unit 31a having a switch circuit 32a which is a concrete example of the switch circuit 32 of FIG. 6.

A transistor TR2 of NPN type is connected to the diode D4 in series, and a bias resistor R14 is provided between a base and a collector of the transistor TR2. There is provided a transistor TR3 of NPN type between a base of the transistor TR2 and a low level power line. An induced voltage that has occurred in the sub winding N3 of the transformer N is applied to a base of the transistor TR3 via a current restricting resistor R15 after the induced voltage has been rectified and smoothed by the diode D5 and the capacitor C7.

Thus, when the power source is turned on, the transistor TR3 is OFF, and the transistor TR2 is made ON by a base current supplied from the bias resistor R14. Thus, when a charging voltage is supplied from the diode D4 to the capacitor C5, the charging voltage of the capacitor C5 causes the control circuit 14 to begin operating. Thus, when the induced voltage occurs in the sub winding N3 of the transformer N, the induced voltage is rectified and smoothed by the diode D5 and the capacitor C7, and the voltage causes the transistor TR3 to be ON. As a result, the transistor TR3 bypasses a current from the bias resistor R14, and the transistor TR2 becomes OFF so as to stop the diode D4 from charging the capacitor C5 at the same time.

As long as the switching power unit 31a is in a steady-state operation, a charging condition of the capacitor C7 is kept, so that an OFF condition of the transistor TR2 is kept. Thus, it is possible to reduce the loss. When the input ac voltage is made OFF, the switching power unit 31a is stopped from operating, so that an electric charge with which the capacitor C7 is charged is consumed from the current restricting resistor R15 via the transistor TR3. Then, the transistor TR3 becomes OFF, and the capacitor C7 becomes ready for the next reactivation of the ac voltage.

Figure 8:
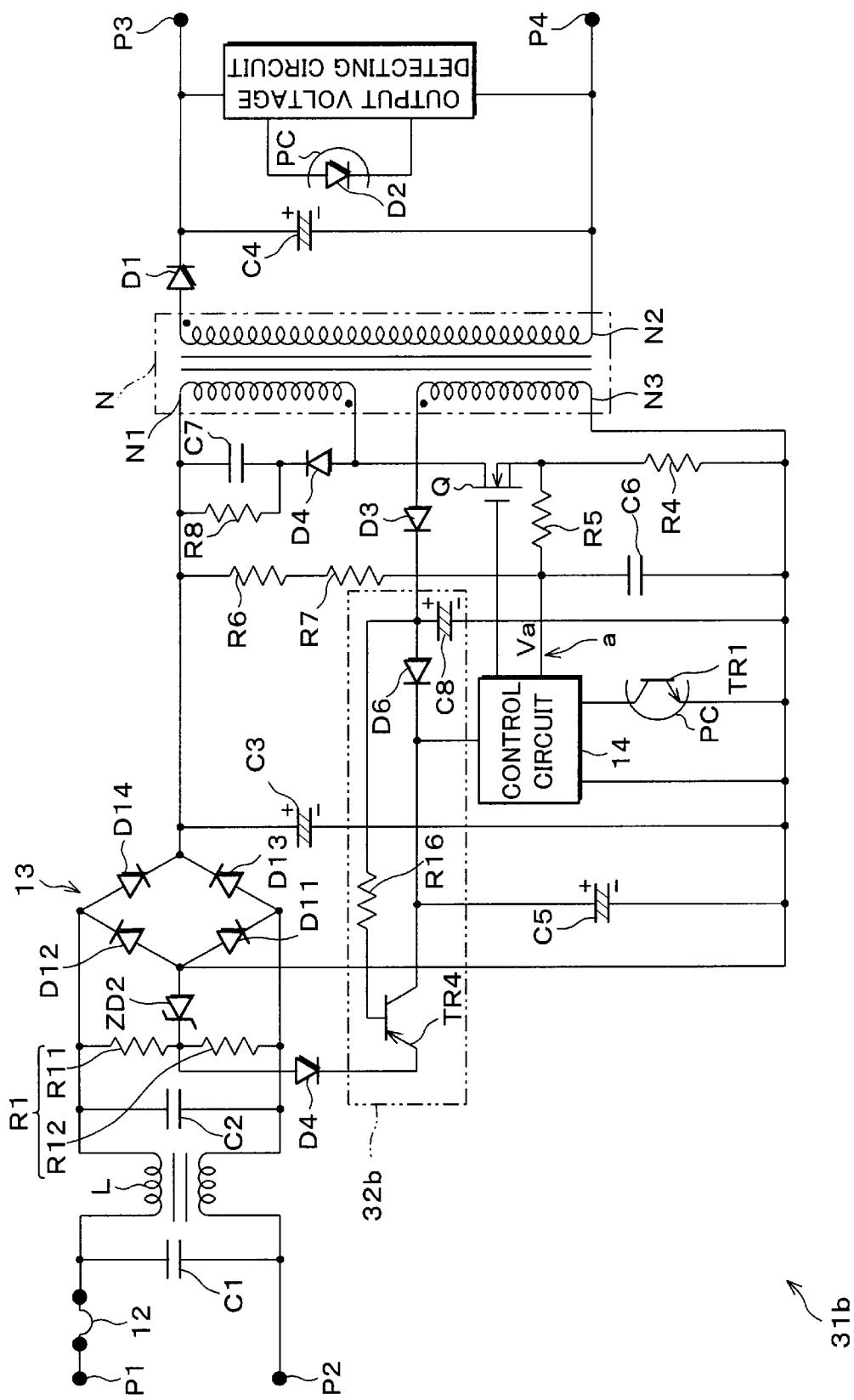
FIG. 8 is an electric circuit diagram for illustrating another concrete example of the switch circuit of the switching power unit shown in FIG. 6.

FIG. 8 is an electric circuit diagram of a switching power unit 31b having a switch circuit 32b which is a concrete example of the switch circuit 32 of FIG. 6.

A transistor TR4 of PNP type is connected to the diode D4 in series. A charging voltage of a capacitor C8 that is charged with the induced voltage of the sub winding N3 of the transformer N is applied to a base of the transistor TR4 via the resistor R16. The induced voltage of the sub winding N3 is applied to the capacitor C8 via the diode D3. Between the capacitor C8 and the control circuit 14/the capacitor C5, a diode D6 for preventing an adverse current intervenes. Further, instead of the resistor R13, the connection point between the series resistors R11 and R12 is connected to a dc-low-level-side terminal of the diode bridge 13 by a zener diode ZD2.

The induced voltage that has occurred in the sub winding N3 of the transformer N is rectified and smoothed by the diode D3 and the capacitor C8 so as to be applied to a base of the transistor TR4. Thus, when the power source is turned on, a charging voltage of the capacitor C8 is low level. Thus, the transistor TR4 becomes ON, and the charging current is supplied from the diode D4 to the capacitor C5, so that the charging voltage of the capacitor C5 causes the control circuit 4 to begin operating. Thus, when the induced voltage occurs in the sub winding N3 of the transformer N, the capacitor C8 is charged with the induced voltage. When the charging voltage becomes not less than a zener voltage of the zener diode ZD2, the transistor TR4 becomes OFF. Then, the charging current is stopped from flowing from the diode D4 to the capacitor C5, and an operation current of the control circuit 14 is supplied in accordance with a current flowing from the capacitor C8 via the diode D6, so that the operation shifts to the steady-state operation. When the input ac voltage is made OFF and the switching power unit 31b stops the operation, the capacitor C8 is discharged via the diode D6 so as to be ready for the next reactivation of the ac voltage after the discharge is completed.

Figure 9A:
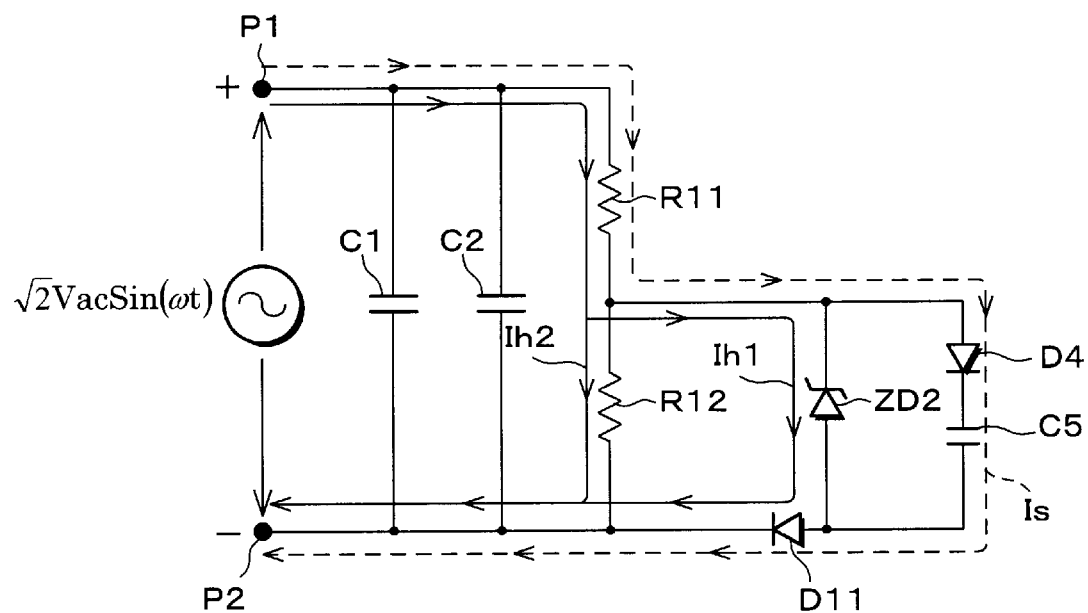
FIG. 9(a) and FIG. 9(b) are equivalent circuit diagrams of a current path which illustrate operations of the switching power unit show in FIG. 8.
Figure 9B:
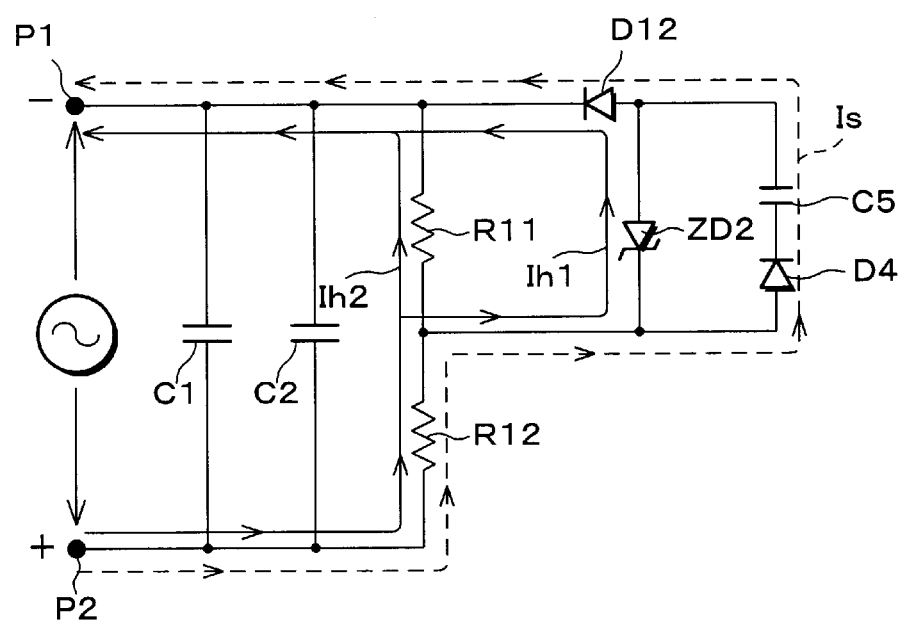

FIG. 9(a) and FIG. 9(b) show equivalent circuits in terms of respective polarities of the input ac voltage of the switching power unit 31b. The same electric path is arranged in FIG. 9(a) and FIG. 9(b), but the resistor R13 is replaced with the zener diode ZD2.

Figure 10:
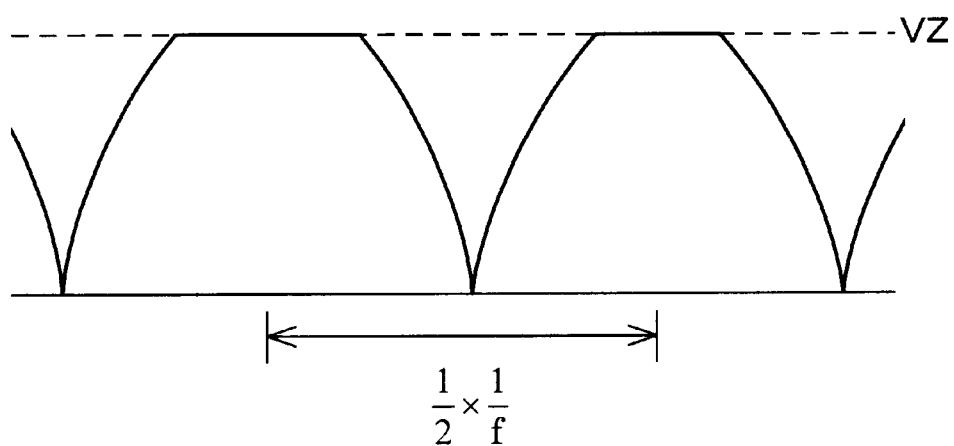
FIG. 10 is a wave form chart for illustrating the operation of the switching power unit shown in FIG. 8.

Here, when Ih>>Is as described above, and voltage drop which occurs in a forward direction of the diodes D11 and D12 is ignored, a voltage wave form of the connection point between the series resistors R11 and R12 is as shown in FIG. 10. In FIG. 10, VZ is a zener voltage of the zener diode ZD2, and f is a frequency of the input ac voltage.

Although the switching power unit 31b has such an advantage that a circuit arrangement is simplified compared with the switching power unit 31a, the power switching unit 31b has the following restrictions. That is, in order to keep the OFF condition of the transistor TR4 in the steady-state operation, it is necessary to set the charging voltage of the capacitor C8 to be higher than the voltage of the connection point between the series resistors R11 and R12. In order to perform the setting management more easily, the zener diode ZD2 is used instead of the resistor R13. Of course, the resistor may be used as long as it is possible to perform the setting management. However, the use of the zener diode ZD2 reduces such risk that: the charging voltage of the capacitor C5 exceeds a rated voltage of the control circuit 14 in the case where the control circuit 14 is in the low-power-consumption mode.

The use of the zener diode ZD2 is suitable for a case where, with respect to the largeness of the fluctuation of the input ac voltage, there is little difference between the operation voltage of the control circuit 14 and the rated voltage. Incidentally, the input ac voltage is 90 to 264 V in a case of a device which satisfies all the international standards for example. Further, the absolute maximum rating of the operation voltage of the control circuit 14 is 28 V for example. In this case, a zener diode whose zener voltage VD is not more than 28 V is used as the zener diode ZD2.

Here, the voltage of the connection point between the series resistors R11 and R12 is set to be higher than an operation starting voltage of the control circuit 14, so as to ensure the activation of the switching power unit 31b, even though the resistor R13 or the zener diode ZD2 is used.

Further, when the switching power unit 31b is in the steady-state operation, it is necessary to set the charging voltage of the capacitor C8 to be higher than the voltage level of the connection point between the series resistors R11 and R12. Besides, the power consumption of the control circuit 14 tends to increase when a power voltage Vcc, that is, the charging voltage of the capacitor C5 is high. For these reasons, it is preferable to employ the switching power unit 31b in a case of designing the device taking the manufacturing cost into consideration, and it is preferable to employ the switching power unit 31a in a case of designing the device taking the power-consumption reduction into consideration.

Note that, in the present example, in a case where the voltage level of the connection point between the series resistors R11 and R12 is sufficiently higher than the operation starting voltage of the control circuit 14, it is preferable to omit the capacitor C8 and the diode D6 so as to connect a cathode of the diode D3 directly to the capacitor C5.

A fourth embodiment of the present invention is described as follows based on FIG. 11.

Figure 11:
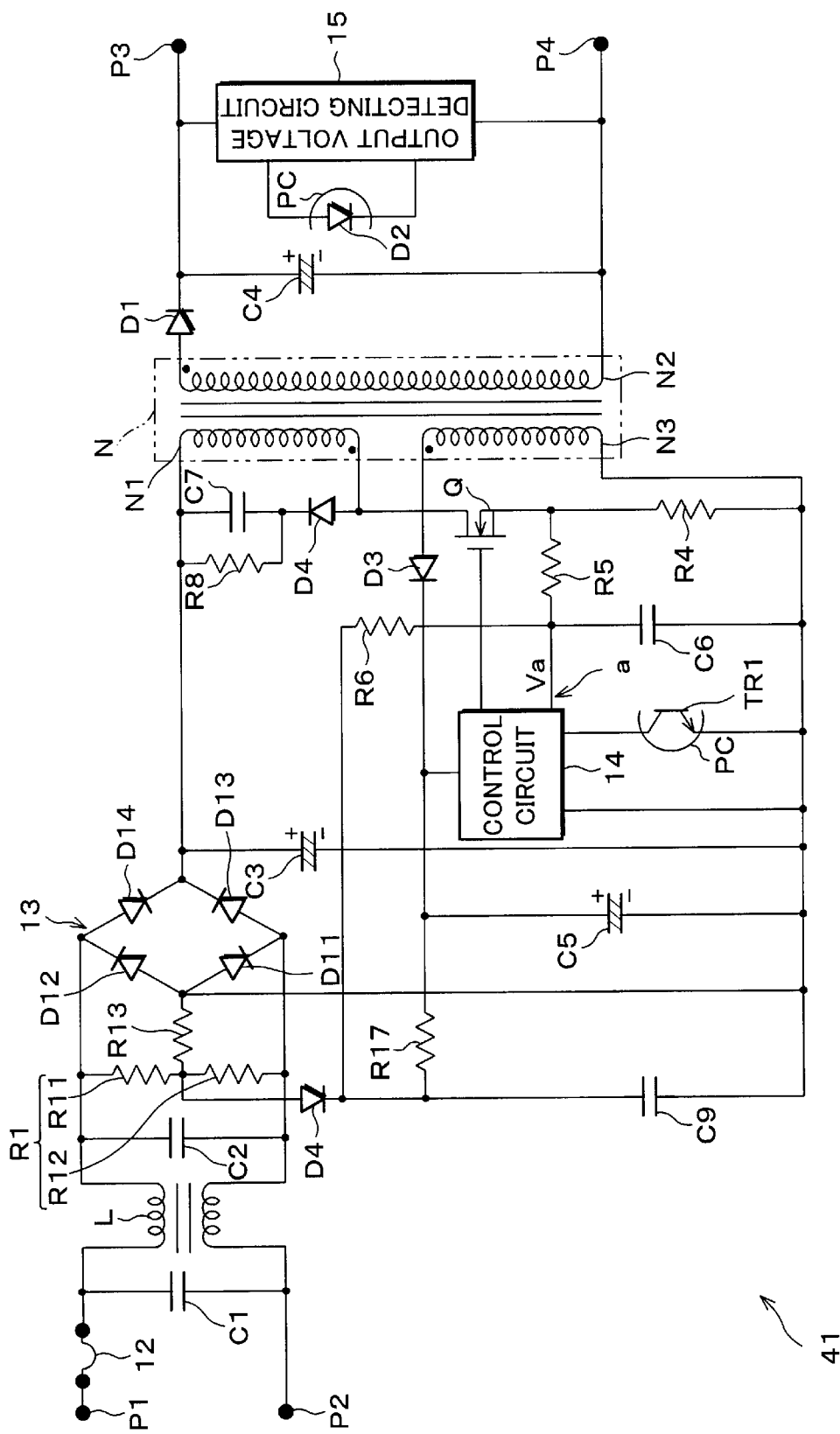
FIG. 11 is an electric circuit diagram of a switching power unit of a fourth embodiment of the present invention.

FIG. 11 is an electric circuit diagram of a switching power unit 41 of the fourth embodiment of the present invention. The switching power unit 41 is similar to the switching power unit 21, and the same reference signs are given to corresponding portions, and description thereof is omitted.

It is noteworthy that, in the switching power unit 41, the voltage of the connection point between the series resistors R11 and R12 is rectified and smoothed by the diode D4 and the capacitor C9, and an operation voltage is supplied to the control circuit 14 via the current restricting resistor R17, and a bias voltage Va is supplied to the current detecting terminal a of the control circuit 14.

Thus, although the bias voltage Va is supplied from a high voltage source (charging voltage of the capacitor c3) in the conventional switching power unit 1, the bias voltage Va is supplied from a low voltage source (charging voltage of the capacitor C9) in the switching power unit 41. Thus, it is possible not only to reduce the loss described above, but also to reduce the loss in the bias resistor R6.

A fifth embodiment of the present invention is described as follows based on FIG. 12.

Figure 12:
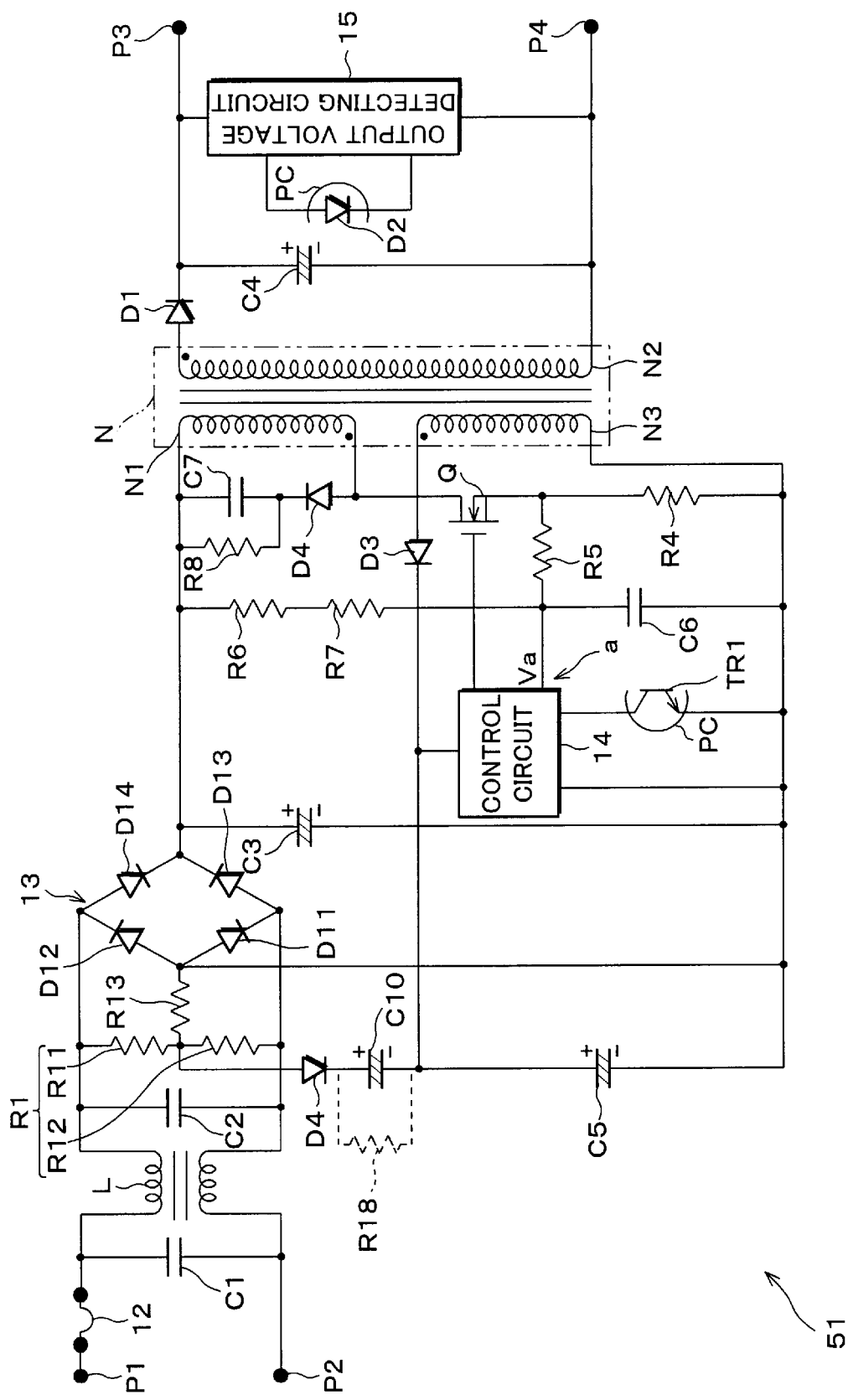
FIG. 12 is an electric circuit diagram of a switching power unit of a fifth embodiment of the present invention.

FIG. 12 is an electric circuit diagram of a switching power unit 51 of the fifth embodiment of the present invention.

The switching power unit 51 is similar to the switching power unit 21. It is noteworthy that, in the switching power unit 51, the voltage of the connection point between the series resistors R11 and R12 is applied to the capacitor C5 via the diode D4 and a capacitor C10.

Thus, when the switching power unit 51 is activated, the activating current of the control circuit 14 is supplied via the diode D4 and the capacitor C10, and the current causes the charging voltage of the capacitor C5 to rise. Then, when the charging voltage becomes the operation starting voltage of the control circuit 14, the switching power unit 51 becomes in the steady-state operation. After the activation is completed, the activating current is supplied via the capacitor C10 in an extremely short time, and the supply of the activating current is stopped when the charging of the capacitor C10 is completed.

When the input ac voltage of the switching power unit 51 is made OFF so as to stop the operation of the switching power unit 51, the charging voltage of the capacitor C10 drops due to spontaneous discharge brought about in the element, so as to be ready for the next activating operation. However, since time taken to perform a reset operation in accordance with the spontaneous discharge is too long, an output of the switching power unit 51 is sometimes not activated, even though an ac voltage is reapplied right after making the input ac voltage OFF. In this case, as shown by the reference sign R18, a discharging resistor whose resistance value is high may be added in series to the capacitor C10.

Further, in the fifth embodiment, the diode D4 may be omitted so as to connect the connection point between the series resistors R11 and R12 directly to the capacitor C10. According to the arrangement, during time in which the voltage level of the input ac voltage is low, the charging voltage of the capacitor C5 is discharged via the resistor R13, so that an extra loss occurs. However, when the input ac voltage is made OFF so as to stop the operation of the switching power unit 51, the capacitor C5 can be ready for the next activation by discharging the charging voltage via the resistor R13.

According to the arrangement, the capacitor C10 performs the same operation as in the switch circuit 32 so as to stop a current that flows via the diode D4 in the steady-state operation. Thus, the loss brought about by the discharging resistor R1 is reduced, so that it is possible to further reduce the loss compared with the switching power unit 21 of FIG. 2. In other words, in accordance with a simple arrangement in which the capacitor C10 is merely added, it is possible to realize the same function as the switch circuit 32.

A sixth embodiment of the present invention is described as follows based on FIG. 13.

Figure 13:
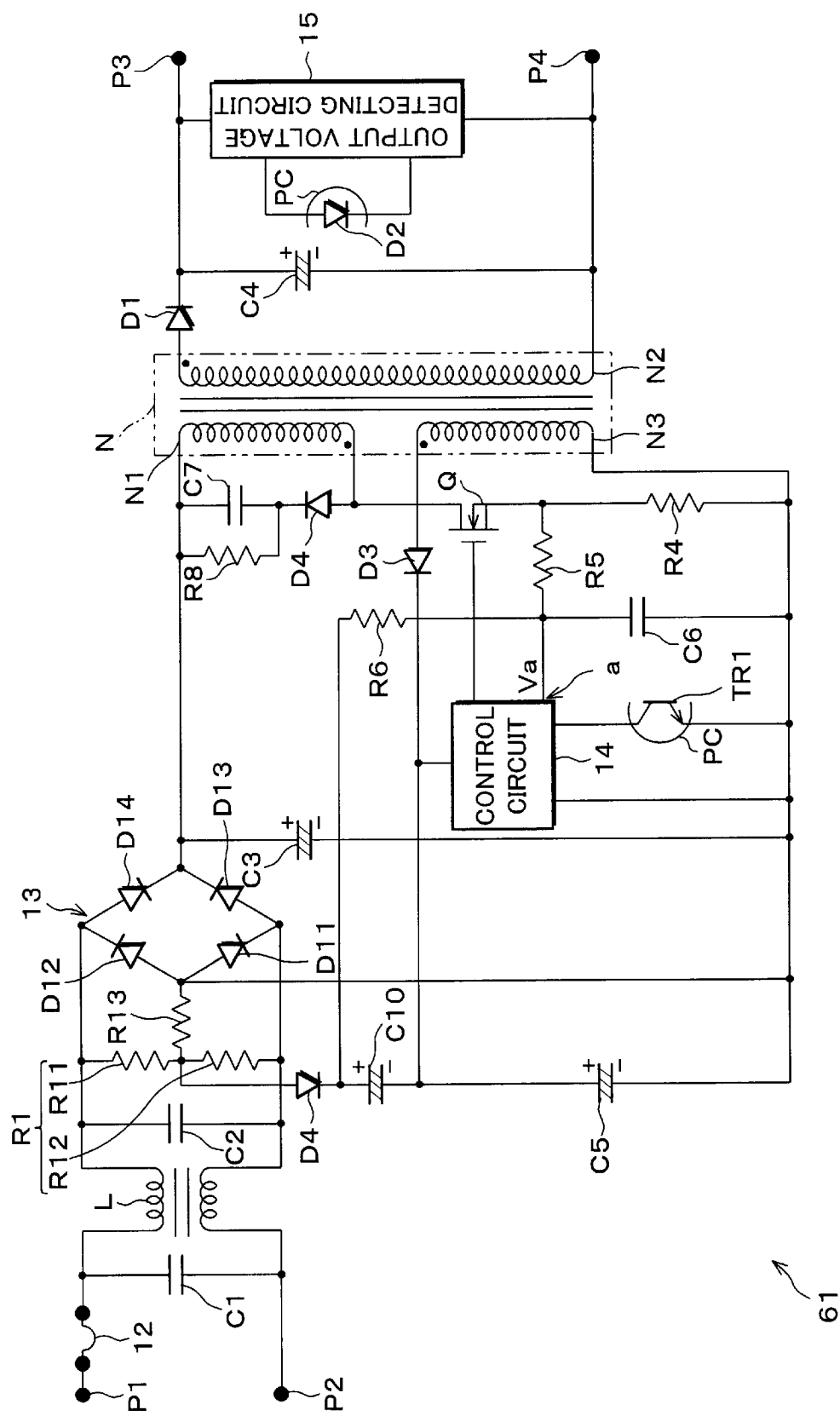
FIG. 13 is an electric circuit diagram of a switching power unit of a sixth embodiment of the present invention.

FIG. 13 is an electric circuit diagram of a switching power unit 61 of the six embodiment of the present invention.

The switching power unit 61 is similar to the switching power units 41 and 51. It is noteworthy that, in the switching power unit 61, as in the switching power unit 51, the voltage of the connection point between the series resistors R11 and R12 is applied to the capacitor C5 via the diode D4 and the capacitor C10, and the voltage is used as the power voltage of the control circuit 14, and the voltage is applied from the connection point between the diode D4 and the capacitor C10 to the current detecting terminal a of the control circuit 14 via the bias resistor R6 as the bias voltage Va. When the input ac voltage is made OFF, the capacitor C10 becomes ready for the next activation by discharging the accumulated electric charge, with which the capacitor C10 has been charged, via the resistors R6, R5, and R4.

According to the arrangement, as described above, the voltage of the connection point between the diode D4 and the capacitor C10 becomes lower than a charging voltage of a smoothing capacitor C3 in proportion to a voltage value of the input ac voltage in the steady-state operation. Thus, it is possible to further reduce the loss in the bias resistor R6 compared with the switching power unit 51.

In the switching power unit, in order to realize energy saving under a standby condition, the following techniques are employed: a switching frequency is dropped or intermittent oscillation (burst oscillation) is performed under a light loading condition. The present invention can realize further energy saving by combining these techniques with each other.

Note that, a document reciting a technique similar to the present invention is Japanese Unexamined Patent Publication No. 2000-350445 (Publication date: Dec. 15, 2000). Prior art recited in the document relates to improvement in an activating characteristic of an RCC (ringing choke converter) system switching power unit which requires no operation power source for a control circuit. On the other hand, the present invention provides means for reducing a loss in an activating circuit of a control circuit.

As described above, the switching power unit of the aforementioned embodiments, in which a main switching element performs switching with respect to a dc voltage obtained by rectifying an input ac voltage with a rectifying circuit, and a control circuit controls the switching according to data of an output voltage feedback from a secondary side so as to stabilize the output voltage at a desired value, includes: a plurality of series resistors provided on an input side of the rectifying circuit; and an activating resistor for supplying a current from a connection point between the series resisters to the control circuit.

According to the arrangement, as a power source of the control circuit, not the dc voltage rectified by the rectifying circuit and smoothed is used, but the input ac voltage to the rectifying circuit is used after being divided by the series resistors so as to be supplied via the activating resistor. Therefore, a loss brought about by the activating resistor is reduced, so that it is possible to improve the efficiency in power conversion of the switching power unit.

Further, in the switching power unit, it is preferable that each of the series resistors is a discharging resistor for discharging an electric charge of a filter capacitor when the input ac voltage is made OFF.

According to the arrangement, it is not necessary to newly provide a resistor as the series resistor, so that it is possible to reduce the number of parts. Further, as described above, in a case where a resistance value of the discharging resistor at which a desired discharging time constant can be obtained in accordance with capacitor of the capacitances, it is also possible to omit the activating resistor.

Furthermore, the switching power unit includes a resistor which connects the connection point between the series resistors to a dc-low-level-side terminal of a diode bridge which is the rectifying circuit, wherein instead of the activating circuit, a diode, that prevents an adverse current from flowing from a power-source side of the control circuit via the resistor, is used.

According to the arrangement, resistance values of the series resistors are equalized to each other, and the resistance values of the series resistor are adjusted, so that it is possible to drop a voltage of the connection point so as to adjust the resistance values to be not less than a rated voltage of the control circuit.

Thus, it is possible not only to delete the loss brought about by the activating resistor by omitting the activating resistor, but also to omit a zener diode for preventing the power voltage of the control circuit from rising. Further, it is possible to omit the activating resistor regardless of a filter capacitor's capacitance.

Further, the switching power unit includes a switch circuit, provided in series to the diode, which is ON when the power source is activated, and is OFF when the switching power unit is in the steady-state operation.

According to the arrangement, in reducing the loss by inserting the switch circuit into the activating circuit, the connection point between the series resistors is connected to a dc-low-level-side terminal of the diode bridge by the resistor, and a voltage of the connection point is low, so that a low-voltage-withstand switch circuit can be used. Thus, it is possible to reduce the manufacturing cost.

Further, in the switching power unit, the switch circuit has: a first transistor of NPN type provided in series to the diode; a bias resistor provided between a collector and a base of the first transistor; a second transistor of NPN type provided between the base of the first transistor and a low level power line; and a rectifying/smoothing circuit for applying an induced voltage, that has occurred in a sub winding of a transformer, to a base of the second transistor after rectifying and smoothing the induced voltage.

According to the arrangement, when the power source is activated, an output voltage of the rectifying/smoothing circuit is low, and the second transistor is OFF, and the first transistor is made ON by a base current supplied from the bias resistor. Thus, a current is supplied from the diode to the power-source side of the control circuit, so that the control circuit begins to operate. Thus, when the induced voltage occurs in the sub winding of the transformer, the voltage is rectified and smoothed so as to be applied to the second transistor, and the second transistor becomes ON so as to bypass a current from the bias resistor, and the first transistor becomes OFF so as to stop supplying the current to the power-source side of the control circuit.

Thus, it is possible to realize an operation of the switching power unit.

Further, in the switching power unit, the switch circuit has: a transistor of PNP type provided in series to the diode; and a rectifying/smoothing circuit for applying an induced voltage, that has occurred in a sub winding of a transformer, to a base of the transistor after rectifying and smoothing the induced voltage.

According to the arrangement, when the power source is turned on, an output voltage of the rectifying/smoothing circuit is low, and the transistor becomes ON, and a current is supplied from the diode to the power-source side of the control circuit, so that the control circuit begins to operate. Thus, when the induced voltage occurs in the sub winding of the transformer, the voltage is rectified and smoothed so as to be applied to the transistor, so that the transistor becomes OFF so as to stop the current from being supplied to the power-source side of the control circuit.

Thus, it is possible to realize operation of the switching power unit.

Further, the switching power unit includes a zener diode which connects the connection point between the series resistors to a dc-low-level-side terminal of the diode bridge which is the rectifying circuit.

According to the arrangement, the resistance values of the series resistors are equalized to each other, and the resistance values of the series resistors are adjusted, so that it is possible to drop a voltage of the connection point so as to adjust the resistance values to be not less than a rated voltage of the control circuit.

Thus, it is possible to delete the loss brought about by the activating resistor by omitting the activating resistor, and it is possible to omit the zener diode for preventing the power voltage of the control circuit from rising.

Further, the switching power unit has: a capacitor for rectifying and smoothing a voltage of the connection point between the series resistors in combination with the diode; a current restricting resistor for supplying a charging voltage of the capacitor as an operation power source of the control circuit; and a bias resistor for supplying the charging voltage of the capacitor as a bias voltage to the control circuit.

In a conventional switching power unit, a bias voltage is supplied from an output terminal of the diode bridge, so that the bias voltage is high. On the other hand, according to the foregoing arrangement, a low charging voltage of the capacitor is supplied as the bias voltage. Thus, it is possible to reduce the loss in the bias resistor.

Further, in the switching power unit, the voltage of the connection point between the series resistors is supplied from the diode via the capacitor as operation power source of the control circuit.

According to the arrangement, when the switching power unit is activated, the capacitor is charged, and the charging current functions as an activating current so as to be supplied to an operation power source of the control circuit. In response to this, the control circuit begins to operate. When the switching power unit becomes in the steady-state operation, the charging of the capacitor is completed, so that the activating current does not flow.

Thus, it is possible to give the capacitor a function similar to the switch circuit for making the activating current ON/OFF.

Further, the switching power unit of the present invention includes a bias resistor for supplying a voltage of the connection point between the diode and the capacitor as a bias voltage to the control circuit.

In a conventional switching power unit, a bias voltage is supplied from an output terminal of the diode bridge, so that the bias voltage is high. On the other hand, according to the foregoing arrangement, a low charging voltage of the capacitor is supplied as the bias voltage. Thus, it is possible to reduce the loss in the bias resistor.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A switching power unit comprising:
   a main switching element for performing switching with respect to a dc voltage that has been obtained by rectifying an input ac voltage with a rectifying circuit;
   a control circuit for controlling the switching according to output voltage data fedback from a secondary side so as to stabilize an output voltage at a desired value;
   a plurality of series resistors provided on an input side of the rectifying circuit; and an activating resistor for supplying an activating current from a connection point between the series resistors to the control circuit.

2. The switching power unit as set forth in claim 1, further comprising a resistor which connects the connection point between the series resistors to a dc-low-level-side terminal of a diode bridge which is the rectifying circuit, wherein instead of the activating resistor, a diode, which prevents an adverse current from flowing from a power-source side of the control circuit via the resistor to the rectifying circuit, is used.

3. The switching power unit as set forth in claim 2, further comprising a switch circuit, provided in series to the diode, which is ON upon activation and is OFF in a steady-state operation.

4. The switching power unit as set forth in claim 3, wherein the switch circuit includes:
a first transistor of NPN type provided in series to the diode;
a bias resistor provided between a collector and a base of the first transistor;
a second transistor of NPN type provided between the base of the first transistor and a low level power line; and
a rectifying/smoothing circuit for applying an induced voltage, that has occurred in a sub winding of a transformer, to a base of the second transistor after rectifying and smoothing the induced voltage.

5. The switching power unit as set forth in claim 3, wherein the switch circuit includes:
a transistor of PNP type provided in series to the diode; and
a rectifying/smoothing circuit for applying an induced voltage, that has occurred in a sub winding of a transformer, to a base of the transistor after rectifying and smoothing the induced voltage.

6. The switching power unit as set forth in claim 1, further comprising a zener diode which connects the connection point between the series resistors to a dc-low-level-side terminal of a diode bridge which is the rectifying circuit.

7. The switching power unit as set forth in claim 2, further comprising:

a capacitor for rectifying and smoothing a voltage of the connection point between the series resistors in combination with the diode;
a current restricting resistor for supplying a charging voltage of the capacitor as an operation power source of the control circuit; and
a bias resistor for supplying the charging voltage of the capacitor to the control circuit as a bias voltage.

8. The switching power unit as set forth in claim 2, wherein a voltage of the connection point between the series resistors is supplied from the diode via the capacitor as an operation power source of the control circuit.

9. The switching power unit as set forth in claim 8, further comprising a bias resistor for supplying a voltage of the connection point between the diode and the capacitor as a bias voltage to the control circuit.

10. The switching power unit as set forth in claim 1, wherein each of the series resistors is a discharging resistor for discharging an electric charge of a filter capacitor when the input ac voltage is OFF.

11. The switching power unit as set forth in claim 10, further comprising a resistor which connects the connection point between the series resistors to a dc-low-level-side terminal of a diode bridge which is the rectifying circuit, wherein instead of the activating resistor, a diode, which prevents an adverse current from flowing from a power-source side of the control circuit via the resistor to the rectifying circuit, is used.

12. The switching power unit as set forth in claim 11, further comprising a switch circuit, provided in series to the diode, which is ON upon activation and is OFF in a steady-state operation.

13. The switching power unit as set forth in claim 12, wherein the switch circuit includes:
a first transistor of NPN type provided in series to the diode;
a bias resistor provided between a collector and a base of the first transistor;
a second transistor of NPN type provided between the base of the first transistor and a low level power line; and
a rectifying/smoothing circuit for applying an induced voltage, that has occurred in a sub winding of a transformer, to a base of the second transistor after rectifying and smoothing the induced voltage.

14. The switching power unit as set forth in claim 12, wherein the switch circuit includes:
a first transistor of PNP type provided in series to the diode; and
a rectifying/smoothing circuit for applying an induced voltage, that has occurred in a sub winding of a transformer, to the second transistor after rectifying and smoothing the induced voltage.

15. The switching power unit as set forth in claim 10, further comprising a zener diode which connects the connection point between the series resistors to a dc-low-level-side terminal of a diode bridge which is the rectifying circuit.

16. The switching power unit as set forth in claim 11, further comprising:

a capacitor for rectifying and smoothing a voltage of the connection point between the series resistors in combination with the diode;
a current restricting resistor for applying a charging voltage of the capacitor as an operation power source of the control circuit; and
a bias resistor for supplying the charging voltage of the capacitor as a bias voltage to the control circuit.

17. The switching power unit as set forth in claim 11, wherein the voltage of the connection point between the series resistors is supplied from the diode via the capacitor as the operation power source of the control circuit.

18. The switching power unit as set forth in claim 17, further comprising a bias resistor for supplying a voltage of the connection point between the diode and the capacitor as a bias voltage to the control circuit.

* * * * *